3,582,362
DRY DRESSING MIX AND METHOD FOR MANUFACTURE
Harvey J. Drews, Rolling Meadows, and Thomas W. Collins, Elgin, Ill., assignors to Kraftco Corporation, New York, N.Y.
No Drawing. Filed Feb. 26, 1968, Ser. No. 707,966
Int. Cl. A23l 1/24
U.S. Cl. 99—144                                    8 Claims

ABSTRACT OF THE DISCLOSURE

A substantially dry composition and a method for making the composition are provided. The composition may be combined with an edible fluid to provide a fluid dressing for use as a salad dressing, marinade or the like. The composition includes an edible carrier which has been treated to reduce the bulk density thereof, an edible acid and a liquid fat. The fat is present at a level of from about 25 percent to about 400 percent by weight of the carrier.

---

The present invention relates generally to food products, and more particularly relates to a substantially dry composition which may be combined with a fluid to provide a dressing or sauce for various foods.

It is well known that a current trend in preparing food products for the consumer is directed to providing food products which are more easily used or which are adapted for storing and longer shelf life or which require less time on the part of the consumer to effect preparation thereof. Food products which have been conceived and directed toward this trend in consumer marketing have sometimes been referred to as "convenience" foods. Convenience foods may be further described as those foods which the manufacturer has treated in some way so as to solve either a storage problem or a preparation problem for the consumer or sometimes to solve both of these problems.

One type of convenience food which would be desirable and which would solve both storage and preparation problems for the consumer is a dry free flowing mix which may be directly combined with a readily available non-fatty fluid, such as water, to provide an acidic oil-base dressing which may be used for salads, marinades or the like. Various known dry mixes have been prepared which are adapted for preparation of oil-base salad dressings. However, these known dry mixes usually require the addition of an oil or fat material and an acidic material, such as vinegar or lemon juice. These known dry mixes do not completely solve the problem to which convenience foods are directed in that the consumer must separately purchase and store an oily or fatty material and the acidic material. It would be desirable to provide a dry particulate mix which may be directly combined with a readily available fluid to provide an acidic, oil-base salad dressing. It would also be desirable to provide a dry particulate mix that can be combined with a non-milk fluid to prepare a cream-base or creamy type dressing.

Accordingly, it is an object of the present invention to provide a substantially dry food mix which can be combined with a fluid to provide a dressing for foods. It is another object of the present invention to provide a substantially dry food mix which can be easily stored and which can be subsequently combined with water to provide a dressing for foods. It is a further object of the present invention to provide a process for preparing a substantially dry food base which can be made into a salad dressing by the addition of water. It is still a further object of the present invention to provide a substantially dry food base which can be combined with water, or other edible fluid, to provide an acidic, oil-base dressing for various foods.

These and other objects of the present invention will become more clear from a reading of the following detailed disclosure.

In general, the present invention provides a substantially dry, particulate composition which may be mixed with an edible fluid, such as water, to provide a salad dressing. The composition comprises a substantially dry, edible, organic acid, an edible carrier and a fatty or oily material. The edible carrier of the invention is treated so as to reduce the bulk density thereof, and to provide the carrier in the form of individual particles.

In general, any edible carrier may be used in the present invention which may be treated to provide an expanded structure, as will be more fully described hereinafter. Such edible carriers can include proteinaceous materials or carbohydrate material. In particular, suitable edible carriers of the present invention may be selected from milk derived products, such as skim mild solids, whey, fortified whey products, modified milk products, lactose, dextrin, sucrose, carboxy methyl cellulose, microcrystalline cellulose, albumin, soy flour, gelatin, carrageenan, gum arabic or mixtures thereof. Certain of the above edible carriers such as whey may be combined with film-forming protein materials, such as gelatin, egg albumin or soy protein, to provide a stronger, more rigid structure, as will be explained more fully herinafter. Also certain of the carriers, such as lactose or gelatin, are preferably only used in combination with other carriers.

The edible carriers of the present invention may be treated by any suitable method to provide the desired characteristics. One suitable method for producing the edible carrier is by gas injection spray drying. In this method of drying, a gas, usually air or nitrogen, is injected into a liquid solution or suspension of the carrier prior to spraying the liquid solution or suspension into the chamber of a spray dryer. The gas is injected into the liquid solution or suspension to be dried with a pressure in excess of that required to effect atomization in a spray nozzle, or that required to operate a centrifugal spray wheel. Thereafter, when the liquid solution or suspension of the edible carrier is atomized to form droplets within the spray dryer, the pressure is reduced and the injected gas expands within a droplet. The expanded droplets then are dried in the spray dryer to form individual, substantially spherical particles with a reduced bulk density. The substantially dry powdered carrier thus produced has a lower density than if the carrier were dried by a conventional spray dry technique. The bulk density of the gas-injected, spray-dried edible carrier can be varied by changing the level of gas which is injected, the type nozzle or centrifugal wheel used, the flow rate of the liquid being pumped, or the pumping pressure.

In general, it is desired to use carriers having a bulk density of from about 0.05 gram/cc. to about 0.30 gram/cc. Bulk density as used herein refers to weight per unit volume of the dried carrier expressed as grams per cc. The bulk density is measured by filling a tared container of known volume, without packing, with the material whose bulk density is to be determined. Thereafter the weight of the container and material are determined, the tare weight is subtracted to obtain the weight of the material, and the weight of the material (in grams) is divided by the known volume of the container (in cc.) to provide the bulk density (in grams/cc.).

The level of oil or fat that may be held and carrier by the carrier depends on the bulk density of the carrier, the particle size distribution of the carrier, and the structural strength of the particles. In general, it is desired to provide carriers having particle sizes in the range of from about .003 inch to about 0.030 inch, and a bulk density in the range of from about 0.05 gram/cc. to about 0.30 gram/cc.

Carriers produced in the above manner by gas injection spray drying may then be blended with a suitable liquid oil in conventional dry blending equipment. The liquid oil may be sprayed or poured onto the carrier in the mixer. The oil may be added at levels of up to about 80 percent, depending upon the particular carrier being used and the conditions of mixing. At certain levels of addition of the oil, depending upon the particular carrier, a critical content is reached, the carrier breaks down, and a paste is formed. It is, of course, desirable to maintain the level of addition of the liquid oil to a level less than that at which the carrier breaks down and a paste is formed.

In this connection, the level of oil which may be held by the carrier is somewhat dependent upon the degree of breakdown of the particle size of the carrier. It has been found that vertical axis blenders, such as kitchen type mixers, are less abusive than horizontal axis mixers, such as ribbon blenders. Other suitable mixing techniques may also be used, such as spraying the liquid fat into a fluidized bed of the carrier.

Also, it has been found that for certain types of carriers, such as whey or non-fat milk solids, the level of breakdown may be reduced by the inclusion of a strengthening agent, such as a film forming protein. Such proteins as sodium caseinate, egg albumin or gelatin may be used. The film forming protein acts to provide a stronger particle which is less subject to breakdown during mixing. When a film forming protein is used, it is desirable to use the protein at a level of from about 5 percent to about 25 percent by weight of the carrier. For example, with whey as the carrier, levels of protein of as low as 5 percent by weight of whey solids provide a substantially stronger particle.

It is preferred to add the liquid fat to the carrier at levels of from about 25 to about 400 percent by weight of the spray dried carrier, i.e., from about 20 to about 80 weight percent of the mixture of fat and carrier. The liquid fat of the present invention may be any liquid fat which is conventionally used to prepare dressing for food. Suitable liquid fats may be selected from olive oil, cottonseed oil, soy bean oil, corn oil, safflower oil, rape seed oil, or mixtures thereof. An antioxidant may be added to the oil to retard development of rancid flavors during storage of the dry mix.

Suitable edible acids may be selected from malic acid, fumari cacid, adipic acid, citric acid, glucono-deltalactone, or combinations of these. It may sometimes be desirable to use a liquid acid, such as glacial acetic acid. When a liquid acid is used, the liquid acid can be combined with the liquid fat prior to addition of the liquid fat to the carrier. When a substantially dry edible acid is used, the acid may be combined with the other components of the composition by any suitable process. For example, the acid may be combined with the carrier prior to treating the carrier by gas injection spray drying or the acid may be mixed with a blend of the carrier and fat. A preferred method is to provide a pre-mix of the acid and any spices which are used and to combine the pre-mix with the blend of carrier and fat.

The acid is provided at a level sufficient to establish a desired pH in the finished dressing product. Generally, for a salad dressing type product, a pH of from about 3.5 to about 5.5 is desired. Other pH levels may be suitable for other types of dressings, such as marinades or the like. It is generally sufficient to provide a dry edible acid at a level of from about 1.5 to about .5 percent by weight of the dry dressing mix to establish the desired pH, although other levels may be used as desired.

For example, the final blend of ingredients to provide a dry salad dressing type composition preferably has the following range of levels of the various ingredients:

| Ingredients: | Weight percent |
|---|---|
| Liquid oil | 20–80 |
| Carrier | 20–60 |
| Acid | 0.2–15.0 |
| Flavoring materials | 1–20 |

The dry salad dressing mix that is provided is readily combined with a suitable liquid to provide a salad dressing by adding the liquid to the dry mix and stirring. The liquid oil is easily released by the carrier and a suspension of the insoluble dry ingredients is provided. The liquid is usually added at a level of from about 25 percent to about 65 percent by weight of the dry dressing mix. Suitable liquids for adding to the dry dressing mix to provide a salad dressing include water, various fruit juices, wine, milk products and combinations of these. In general, the addition of water will provide a desirable salad dressing.

A cream type dressing may be provided by the selection of a suitable carrier. For example, when whey is selected as a carrier, a creamy textured dressing can be provided when the whey is present at a level of from about 20 percent to about 60 percent by weight of the dry dressing mix. For an even more creamy texture in the finished dressing, a skim milk or whole milk carrier can be used, either alone or in combination with whey.

As indicated above, milk-derived carriers may be used to provide desirable cream type dressings. When long shelf life of the liquid dressing that is derived from the dry mix of the invention is desired the milk-derived carriers are preferably used at levels sufficient to provide a level of less than about 18 percent by weight lactose of the non-oil liquid portion of the finished dressing. At higher levels of lactose in the non-oil liquid portion of the dressing crystallization of the lactose slowly occurs and a grainy texture is noted after a few days storage. To provide the desired level of fat at the indicated preferred level of lactose in the liquid portion of the dressing when a milk-derived carrier is used, the milk-derived carrier may be combined with other non-lactose containing carriers of the invention. Of course, if the dressing is to be consumed within a day or so after being prepared in liquid form there is no need to limit the level of lactose.

Emulsifiers, such as sorbitol or mono- and di-glycerides may be used in the dry dressing mix if desired so as to provide a more uniform, stable emulsion of the liquid fat and the fluid which is subsequently added. Stabilizers, such as guar gum, carob gum, gum tragacanth and carrageenan may also be used in the dry dressing mix of the invention. The use of stabilizers permits the use of spice mixtures containing large particles of flavoring materials, such as cheese or chopped vegetables or the like, in the dry mix. Stabilizers also have some emulsification properties and additional emulsifying agents may not be required when stabilizers are used. Such dry mix, containing stabilizers, when combined with a liquid provides a stable suspension of the particles of flavoring materials. Stabilizers and emulsifiers, when used, may be combined with the other components of the dressing compositions in any suitable manner.

The following examples further illustrate various features of the present invention, but are intended to in no way limit the scope of the invention, which is defined in the appended claims.

EXAMPLE I

Sweet whey obtained from a cottage cheese make process was concentrated to a level of 35 percent solids. The concentrated whey was pumped at a pressure of 2200 p.s.i.g. to a single fluid nozzle in a spray dry chamber. Prior to reaching the nozzle, air was injected into the flowing stream of whey at a level of 2500 p.s.i.g. The whey was then atomized in the spray dry chamber and it was dried to a level of 3.5 percent by weight moisture. The whey had a bulk density of 0.08 gm./cc.

Refined and bleached cottonseed oil was then poured onto the surface of 318 grams of the whey as the whey was being stirred in a vertical axis kitchen blender. The oil was added to provide a level of 65 percent oil by weight based on the combined weight of the oil and whey. A cheese-garlic spice mix was then combined with dry malic acid to provide a spice-acid pre-mix. The spice-acid pre-mix had 86 percent spice and 14 percent dry malic acid by weight. The spice-acid pre-mix was then added to the oil-carrier blend at a level of 91 percent by weight of the oil-carrier blend to provide a substantially dry mix which can be prepared into a dressing by addition of water. The substantially dry mix had the following level of ingredients by weight of the finished mix on a dry basis:

| Ingredients: | Weight percent |
| --- | --- |
| Cottonseed oil | 59 |
| Whey | 31.8 |
| Malic acid | 1 |
| Cheese-garlic spice mix | 7 |

A liquid dressing was then prepared by adding 90 ml. of water to 165 grams of the above-described dry mix. The liquid dressing was obtained readily by simply stirring the mixture of dry mix and water. A dressing was obtained which had a creamy, opalescent color. The taste was excellent and compared favorably with a prepared liquid cheese-garlic dressing mix which had been stored as a liquid in glass containers. The liquid dressing obtained from the dry mix of the present invention remains stable without settling of particles and without the use of added stabilizers.

EXAMPLE II

The above-described oil-carrier blend of Example I was used to prepare a Green Goddess dressing. The oil-carrier blend was combined with an adipic acid-spice premix to obtain the following dry mix:

| Ingredients: | Weight percent |
| --- | --- |
| Soybean oil | 58.4 |
| Whey | 31.5 |
| Acid | 1.1 |
| Spices | 8.7 |
| Guar gum | 0.25 |

The above-described dry mix was used to prepare a Green Goddess dressing by adding water thereto. The water was added at a level of 83 ml. per 125 grams of the dry mix. A creamy-textured Green Goddess dressing was obtained with excellent flavor properties. The Green Goddess dressing prepared by the method of the present invention compared favorably with respect to both texture and flavor with a Green Goddess dressing which had been prepared initially as a liquid and stored in glass containers.

The present invention provides a substantially dry food composition containing all of the ingredients required to provide an oil-base, acidic dressing by adding water to the dry composition. A creamy, opalescent, smooth-textured salad dressing can be prepared by selecting a suitable carrier. The oil of the dry dressing mix is easily released and the dry dressing mix is easily combined with a liquid to provide a finished dressing.

What is claimed is:
1. A substantially dry composition which may be mixed with an edible fluid to provide a fluid dressing, which composition consists essentially of a mixture of a substantially dry edible carrier selected from skim milk solids, whey, lactose, dextrin, sucrose, carboxy methyl cellulose, microcrystalline cellulose, albumin, soy flour, gelatin, carrageenan, gum arabic, or mixtures thereof, a liquid edible fat and an edible acid, said carrier having a bulk density of from about 0.05 to about 0.30 gram per cubic centimeter, said carrier being present at a level of from about 20 percent to about 60 percent by weight of said composition and said fat being present at a level of from about 25 percent to about 400 percent by weight of said carrier, said edible acid being present at a level sufficient to establish a desired pH in the fluid dressing.

2. A composition in accordance with claim 1 wherein said edible acid is present at a level sufficient to provide a pH of from about 3.5 to about 5.5 in the fluid dressing.

3. A composition in accordance with claim 1 wherein said liquid fat is selected from glyceride oils.

4. A composition in accordance with claim 1 wherein said edible acid is selected from malic acid, fumaric acid, adipic acid, citric acid, acetic acid, or mixtures thereof.

5. A composition in accordance with claim 1 which further consists of spices and flavoring materials.

6. A method for making a substantially dry composition which may be mixed with an edible fluid to provide a fluid dressing comprising forming a fluid dispersion of an edible solid selected from skim milk solids, whey, lactose, dextrin, sucrose, carboxy methyl cellulose, microcrystalline cellulose, albumin, gelatin, soy flour, carrageenan, gum arabic, or mixtures thereof, injecting a gas into said dispersion, spray drying said dispersion containing said injected gas to provide a substantially dry edible carrier having a bulk density of from about 0.05 to about 0.30 gram per cubic centimeter and thereafter blending a liquid edible fat and an edible acid with said spray dried edible carrier, said carrier being present at a level of from about 20 percent to about 60 percent by weight of the composition and said liquid edible fat being present at a level of from about 25 percent to about 400 percent by weight of said carrier, said edible acid being present at a level sufficient to establish a desired pH in the fluid dressing.

7. A method in accordance with claim 6 wherein said edible acid is present at a level sufficient to provide a pH of from about 3.5 to about 5.5 when said carrier is mixed with an edible fluid to provide a fluid dressing.

8. A method in accordance with claim 6 wherein said liquid edible fat is selected from glyceride oils.

References Cited

UNITED STATES PATENTS

| 2,471,435 | 5/1949 | Kimball | 99—144 |
| 3,222,193 | 12/1965 | Hanrahan | 99—199X |
| 3,396,034 | 8/1968 | Blondheim et al. | 99—199X |

FOREIGN PATENTS

| 591,010 | 1/1960 | Canada | 99—124 |

RAYMOND N. JONES, Primary Examiner

J. M. HUNTER, Assistant Examiner